(12) United States Patent
Tsushima et al.

(10) Patent No.: US 12,166,182 B2
(45) Date of Patent: Dec. 10, 2024

(54) BATTERY WITH SEPARATELY ARRANGED WINDING STOP TAPES

(71) Applicant: Prime Planet Energy & Solutions, Inc., Tokyo (JP)

(72) Inventors: Tatsuya Tsushima, Minamiawaji (JP); Takashi Hosokawa, Hyogo-ken (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 52 days.

(21) Appl. No.: 17/518,287

(22) Filed: Nov. 3, 2021

(65) Prior Publication Data

US 2022/0149440 A1 May 12, 2022

(30) Foreign Application Priority Data

Nov. 9, 2020 (JP) ................................. 2020-186228

(51) Int. Cl.
*H01M 10/0587* (2010.01)
*H01M 50/183* (2021.01)
*H01M 50/531* (2021.01)

(52) U.S. Cl.
CPC ..... *H01M 10/0587* (2013.01); *H01M 50/183* (2021.01); *H01M 50/531* (2021.01)

(58) Field of Classification Search
CPC ........... H01M 10/0587; H01M 50/531; H01M 50/183
See application file for complete search history.

(56) References Cited

U.S. PATENT DOCUMENTS

| | | |
|---|---|---|
| 2017/0084958 A1 | 3/2017 | Ueda |
| 2017/0125778 A1 | 5/2017 | Iwasa et al. |
| 2020/0144650 A1 | 5/2020 | Kim et al. |
| 2020/0295339 A1 | 9/2020 | Kwak et al. |

FOREIGN PATENT DOCUMENTS

| | | | | |
|---|---|---|---|---|
| CN | 106030890 A | 10/2016 | | |
| CN | 106165152 A | 11/2016 | | |
| CN | 107919443 A | 4/2018 | | |
| CN | 108461811 A | * 8/2018 | ........ | H01M 10/0525 |
| CN | 111682250 A | 9/2020 | | |
| JP | 2012-69290 A | 4/2012 | | |
| JP | 201569730 A | 4/2015 | | |

(Continued)

OTHER PUBLICATIONS

English Translation for JP 2015069730 (Year: 2015).*

*Primary Examiner* — Jimmy Vo
(74) *Attorney, Agent, or Firm* — HAUPTMAN HAM, LLP

(57) ABSTRACT

A battery disclosed herein includes: an exterior body including a bottom wall and an opening facing the bottom wall; a sealing plate sealing the opening of the exterior body; and one or a plurality of wound electrode bodies, in which a band-shaped positive electrode including a positive electrode active material layer and a band-shaped negative electrode including a negative electrode active material layer are laminated via a band-shaped separator and are wound around a winding axis. A length of the positive electrode active material layer is 15 cm or more in a winding axis direction of the wound electrode body. A plurality of winding stop tapes are attached to an outer surface of the wound electrode body at intervals in the winding axis direction.

15 Claims, 12 Drawing Sheets

(56) References Cited

FOREIGN PATENT DOCUMENTS

| | | | |
|---|---|---|---|
| JP | 2015069730 A * | 4/2015 | |
| JP | 2015146076 A | 8/2015 | |
| JP | 201658264 A | 4/2016 | |
| JP | 2016100270 A * | 5/2016 | |
| JP | 2017079139 A | 4/2017 | |
| JP | 2017-143007 A | 8/2017 | |
| WO | 2015/146076 A1 | 10/2015 | |
| WO | WO-2015159433 A1 * | 10/2015 | ........ H01M 10/0431 |

* cited by examiner

BATTERY WITH SEPARATELY ARRANGED WINDING STOP TAPES

CROSS-REFERENCE TO RELATED APPLICATIONS

Priority is claimed on the basis of Japanese Patent Application No. 2020-186228, filed Nov. 9, 2020, the content of which is incorporated herein by reference.

BACKGROUND OF THE INVENTION

1. Field of the Invention

The present teaching relates to a battery.

2. Description of the Related Art

Conventionally, a battery including a wound electrode body, in which a band-shaped positive electrode including a positive electrode active material layer on a positive electrode current collecting body and a band-shaped negative electrode including a negative electrode active material layer on a negative electrode current collecting body are laminated via a band-shaped separator and are wound around a winding axis, are known (WO2015/146076 and Japanese Patent Application Laid-open No. 2012-69290). For example, WO2015/146076 discloses a lithium ion secondary battery in which, in order to prevent loosening of winding of a winding type electrode body, a winding stop tape is attached to a winding end portion thereof to fix the battery to the winding type electrode body itself.

SUMMARY

In a high-capacity type battery used for in-vehicle use and the like, a size of a wound electrode body increases. As the size of the wound electrode body increases, a winding stop tape for preventing loosening of winding thereof also becomes longer. When the winding stop tape becomes longer, it is likely to be twisted when pulled out, and wrinkles are likely to occur when being attached to the wound electrode body. When the winding stop tape is wrinkled, a step is formed in the wound electrode body, and a thickness thereof is locally increased. Thus, when a pressure is applied to the wound electrode body during a manufacturing process or use of the battery, the wrinkled portion is strongly pressed. As a result, an uneven charging and discharging reaction may occur, and metallic lithium (dendrite) may be deposited.

The present invention has been made in view of the above circumstances, and an object of the present invention is to provide a battery in which wrinkles are less likely to occur in a winding stop tape and an uneven charging and discharging reaction is inhibited.

The present invention provides a battery including: an exterior body including a bottom wall and an opening facing the bottom wall; a sealing plate sealing the opening of the exterior body; and one or more wound electrode bodies in which a band-shaped positive electrode including a positive electrode active material layer and a band-shaped negative electrode including a negative electrode active material layer are laminated via a band-shaped separator and are wound around a winding axis. The wound electrode body is accommodated in the exterior body such that the winding axis is along the bottom wall of the exterior body. A length of the positive electrode active material layer is 15 cm or more in a winding axis direction of the wound electrode body. A plurality of winding stop tapes are attached to an outer surface of the wound electrode body at intervals in the winding axis direction.

In the above battery, the plurality of winding stop tapes are attached to the outer surface of the wound electrode body at intervals. Thus, even in a case in which a length of the wound electrode body in the winding axis direction is long (specifically, the length of the positive electrode active material layer is 15 cm or more), it is possible to relatively inhibit the occurrence of wrinkles on the winding stop tapes as compared with the case of attaching one linear winding stop tape. As a result, an uneven reaction is less likely to occur during charging and discharging, and the generation of dendrite can be inhibited.

In a preferred aspect of the battery disclosed herein, the wound electrode body is provided in plurality. In a case in which the number of wound electrode bodies is plural, the influence of wrinkles becomes particularly large. Accordingly, it is particularly effective to apply the technique disclosed herein.

A preferred aspect of the battery disclosed herein includes a positive electrode tab group that includes a plurality of positive electrode tabs protruding at one end of the wound electrode body in the winding axis direction and is electrically connected to the positive electrode, and a negative electrode tab group that includes a plurality of negative electrode tabs protruding at the other end of the wound electrode body in the winding axis direction and is electrically connected to the negative electrode. In such a configuration, the length of the wound electrode body in the winding axis direction becomes longer, and wrinkles are likely to occur in the winding stop tapes. Accordingly, it is particularly effective to apply the technique disclosed herein.

In a preferred embodiment of the battery disclosed herein, the positive electrode tab group and the negative electrode tab group are eccentrically disposed on the sealing plate side in a direction perpendicular to the sealing plate. With such a configuration, a conduction path to a terminal can be shortened.

In a preferred aspect of the battery disclosed herein, the plurality of winding stop tapes are disposed on a straight line connecting the positive electrode tab group to the negative electrode tab group.

In a preferred aspect of the battery disclosed herein, when the length of the positive electrode active material layer is 100% in the winding axis direction, a proportion of a total length of the plurality of winding stop tapes is 20% or more and 70% or less. With such a configuration, it is possible to prevent or inhibit an uneven charging and discharging reaction and generation of dendrite to a high level.

In a preferred aspect of the battery disclosed herein, a distance between the plurality of adjacent winding stop tapes is 30 mm or more and 105 mm or less. With such a configuration, it is possible to prevent or inhibit the uneven charging and discharging reaction and generation of dendrite to a high level.

DETAILED DESCRIPTION OF THE PREFERRED EMBODIMENTS

Hereinafter, some preferred embodiments of the technique disclosed herein will be described with reference to the figures. Matters other than those specifically mentioned in the present specification and necessary for carrying out the present invention (for example, general configurations and manufacturing processes of a battery that do not characterize the present invention) can be understood as design matters for a person skilled in the art based on conventional techniques in the art. The present invention can be carried out on the basis of the content disclosed in the present specification and common technical knowledge in the art. Also, in the present specification, the notation "A to B" indicating a range includes the meanings "A or more and B or less," and the meaning "preferably larger than A and smaller than B."

In addition, in the present specification, the term "battery" is a term that refers to all power storage devices capable of extracting electrical energy and is a concept that includes a primary battery and a secondary battery. Further, in the present specification, the term "secondary battery" refers to all power storage devices capable of being repeatedly charged and discharged and is a concept including a so-called storage battery (a chemical battery) such as a lithium ion secondary battery or a nickel hydrogen battery, and a capacitor (a physical battery) such as an electric double layer capacitor.

Battery 100

Figure 1:
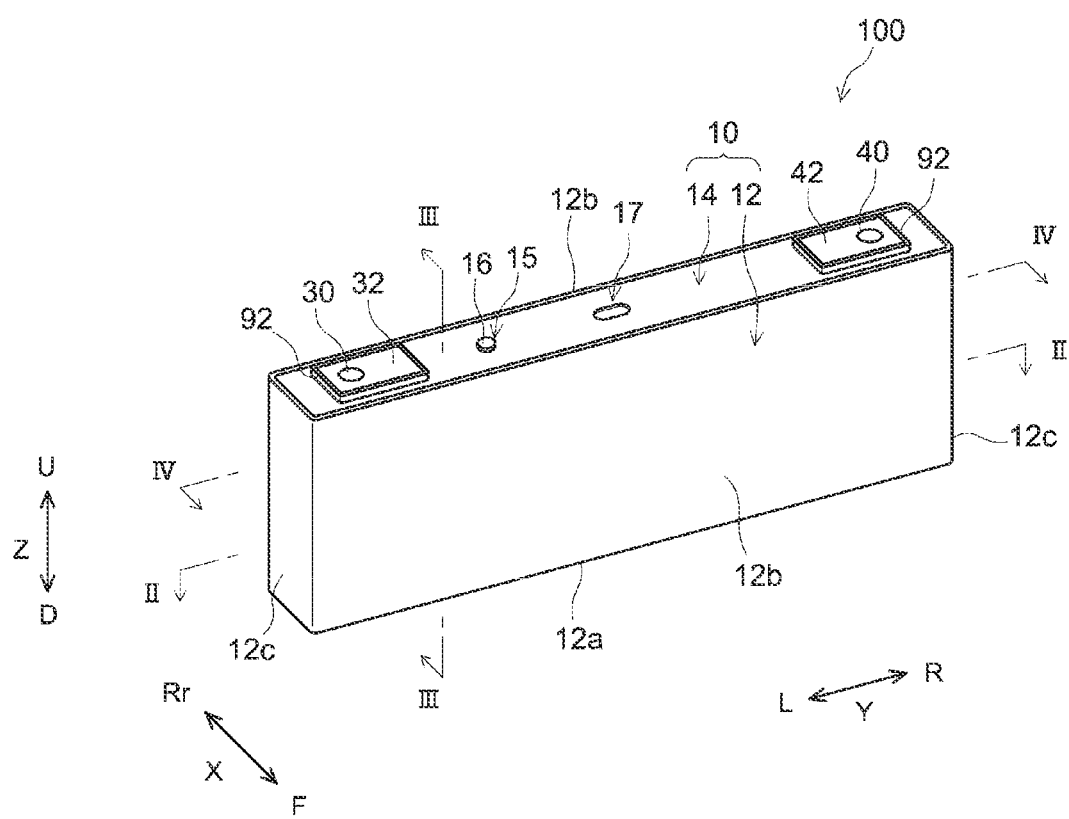
FIG. 1 is a perspective view schematically showing a battery according to an embodiment.
Figure 2:
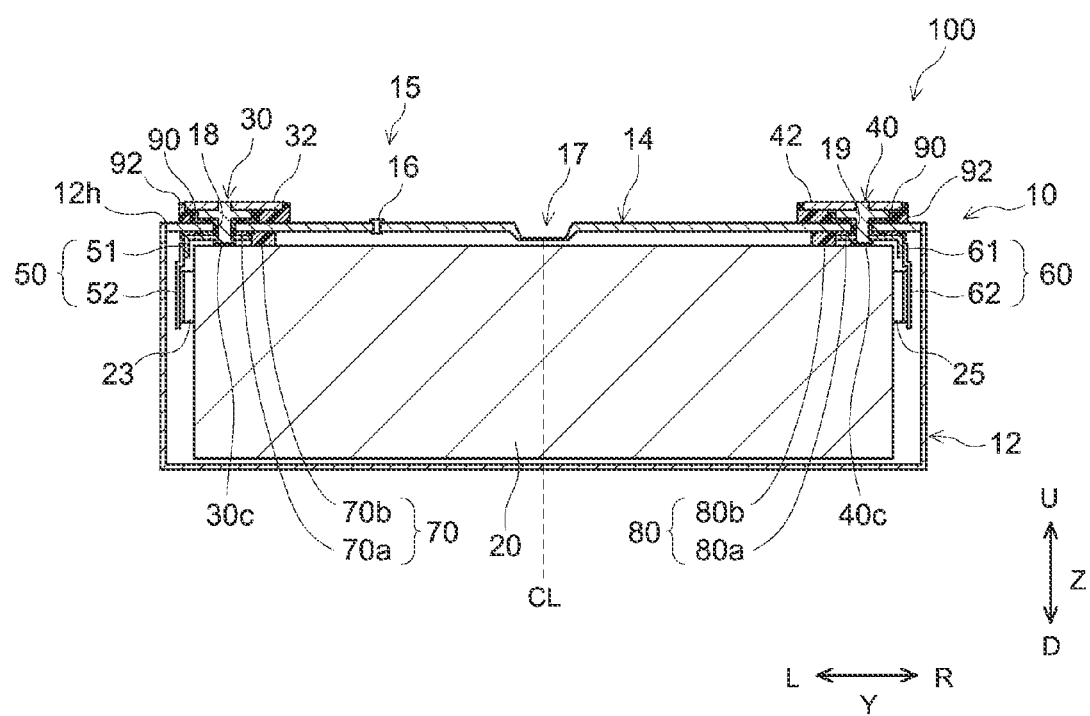
FIG. 2 is a schematic vertical cross-sectional view along line II-II of FIG. 1.
Figure 3:
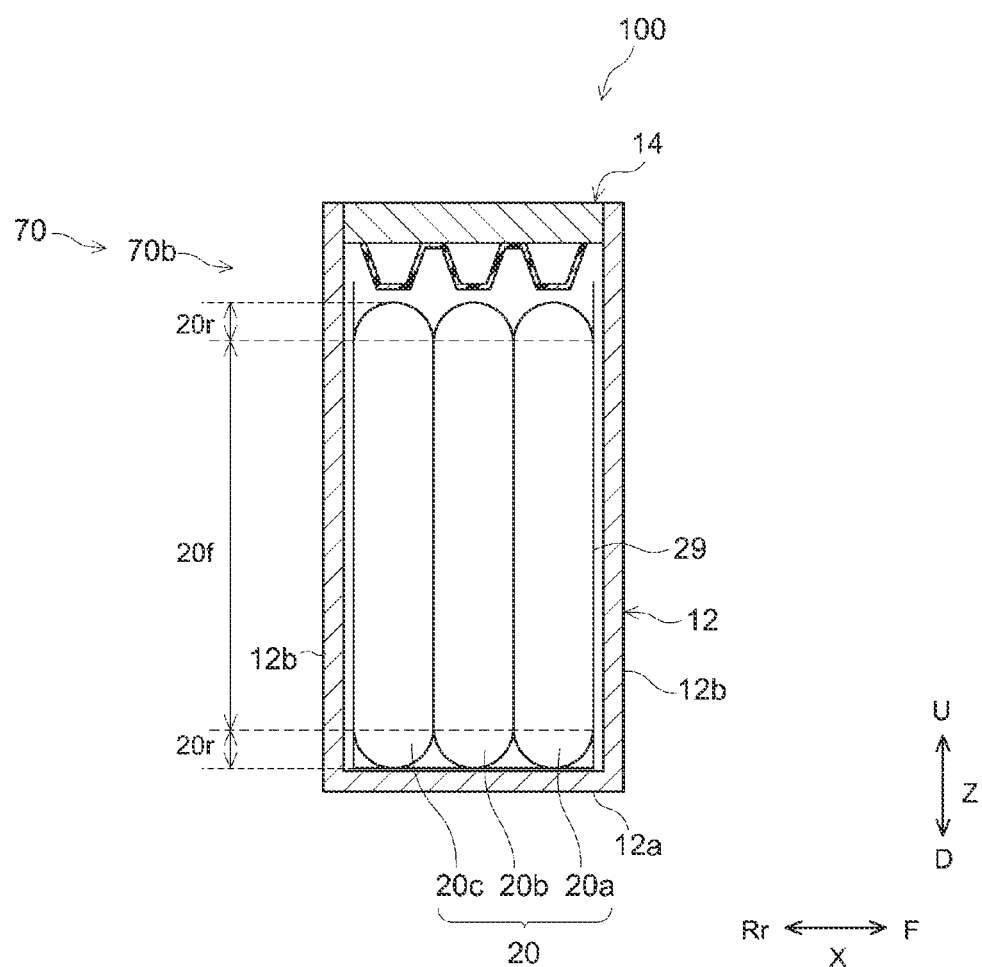
FIG. 3 is a schematic vertical cross-sectional view along line of FIG. 1.
Figure 4:
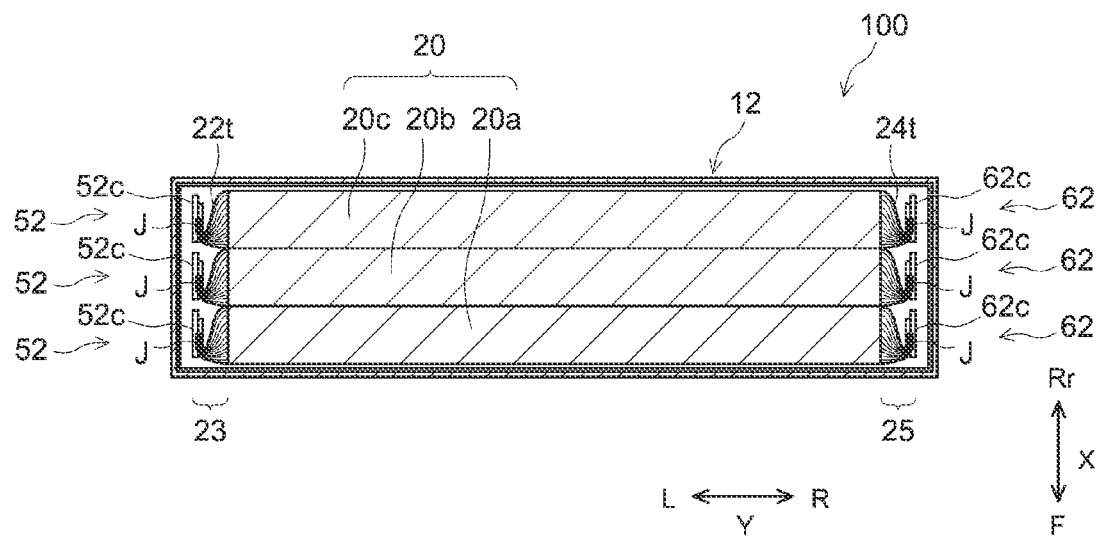
FIG. 4 is a schematic cross-sectional view along line IV-IV of FIG. 1.

FIG. 1 is a perspective view of a battery 100. FIG. 2 is a schematic vertical cross-sectional view along line II-II of FIG. 1. FIG. 3 is a schematic vertical cross-sectional view along line of FIG. 1. FIG. 4 is a schematic cross-sectional view along line IV-IV of FIG. 1. Also, in the following description, reference numerals L, R, F, Rr, U, and D in the figures represent leftward, rightward, frontward, rearward, upward, and downward, and reference numerals X, Y, and Z in the figures represent a short side direction of a battery 100, a long side direction orthogonal to the short side direction, and a vertical direction, respectively. However, these are merely directions for convenience of explanation and do not limit an installation form of the battery 100 at all.

As shown in FIG. 2, the battery 100 includes a battery case 10, an electrode body group 20, a positive electrode terminal 30, a negative electrode terminal 40, a positive electrode current collecting unit 50, a negative electrode current collecting unit 60, a positive electrode insulating member 70, and a negative electrode insulating member 80. As will be described in detail later, the electrode body group 20 has wound electrode bodies 20a, 20b, and 20c (see FIG. 3). Although not shown, the battery 100 further includes an electrolytic solution here. The battery 100 is a lithium ion secondary battery here. The battery 100 is characterized by including the wound electrode bodies 20a, 20b, and 20c, and other configurations may be the same as conventional ones.

The battery case 10 is a housing for accommodating the electrode body group 20. The battery case 10 has a flat and bottomed rectangular parallelepiped outer shape here. A material of the battery case 10 may be the same as that conventionally used, and there is no particular limitation. The battery case 10 is preferably made of a metal, and more preferably made of, for example, aluminum, an aluminum alloy, iron, an iron alloy, or the like. As shown in FIG. 2, the battery case 10 includes an exterior body 12 having an opening 12h, and a sealing plate (a lid body) 14 that closes the opening 12h.

As shown in FIG. 1, the exterior body 12 includes a bottom wall 12a, a pair of long side walls 12b that extend from the bottom wall 12a and face each other, and a pair of short side walls 12c that extend from the bottom wall 12a and face each other. The bottom wall 12a has a substantially rectangular shape. The bottom wall 12a faces the opening 12h. An area of the short side wall 12c is smaller than an area of the long side wall 12b. The sealing plate 14 is attached to the exterior body 12 to close the opening 12h of the exterior body 12. The sealing plate 14 faces the bottom wall 12a of the exterior body 12. The sealing plate 14 has a substantially rectangular shape in a plan view. The battery case 10 is integrated by joining (for example, welding) the sealing plate 14 to a peripheral edge of the opening 12h of the exterior body 12. The battery case 10 is airtightly sealed (hermetically closed).

As shown in FIG. 2, the sealing plate 14 is provided with a liquid injection hole 15, a gas discharge valve 17, and two terminal lead-out holes 18 and 19. The liquid injection hole 15 is for injecting an electrolytic solution after the sealing plate 14 is assembled to the exterior body 12. The liquid injection hole 15 is sealed by a sealing member 16. The gas discharge valve 17 is configured to break when a pressure inside the battery case 10 is equal to or more than a predetermined value and discharge a gas inside the battery case 10 to the outside. The terminal lead-out holes 18 and 19 are formed at both end portions of the sealing plate 14 in the long side direction Y. The terminal lead-out holes 18 and 19 penetrate the sealing plate 14 in the vertical direction Z. The terminal lead-out holes 18 and 19 each have an inner diameter large enough to allow the positive electrode terminal 30 and the negative electrode terminal 40 to be inserted therethrough before being attached to the sealing plate 14 (before caulking).

The positive electrode terminal 30 and the negative electrode terminal 40 are fixed to the sealing plate 14. The positive electrode terminal 30 is disposed on one side (the left side of FIGS. 1 and 2) of the sealing plate 14 in the long side direction Y. The negative electrode terminal 40 is disposed on the other side (the right side of FIGS. 1 and 2) of the sealing plate 14 in the long side direction Y. As shown in FIG. 1, the positive electrode terminal 30 and the negative electrode terminal 40 are exposed on an outer surface of the sealing plate 14. As shown in FIG. 2, the positive electrode terminal 30 and the negative electrode terminal 40 are inserted through the terminal lead-out holes 18 and 19 to extend from the inside to the outside of the sealing plate 14. Here, the positive electrode terminal 30 and the negative electrode terminal 40 are crimped to peripheral portions surrounding the terminal lead-out holes 18 and 19 of the sealing plate 14 by caulking. Caulking portions 30c and 40c are formed at end portions (lower end portions in FIG. 2) of the positive electrode terminal 30 and the negative electrode terminal 40 on the exterior body 12 side.

As shown in FIG. 2, the positive electrode terminal 30 is electrically connected to a positive electrode 22 (see FIG. 7) of the electrode body group 20 via the positive electrode current collecting unit 50 inside the exterior body 12. The negative electrode terminal 40 is electrically connected to a negative electrode 24 (see FIG. 7) of the electrode body group 20 via the negative electrode current collecting unit 60 inside the exterior body 12. The positive electrode terminal 30 is insulated from the sealing plate 14 by the positive electrode insulating member 70 and a gasket 90. The negative electrode terminal 40 is insulated from the sealing plate 14 by the negative electrode insulating member 80 and the gasket 90.

The positive electrode terminal 30 is preferably made of a metal, and more preferably made of, for example, aluminum or an aluminum alloy. The negative electrode terminal 40 is preferably made of a metal, and more preferably made of, for example, copper or a copper alloy. The negative electrode terminal 40 may be configured by joining two conductive members and integrating them. For example, a portion connected to the negative electrode current collecting unit 60 may be made of copper or a copper alloy, and a portion exposed on the outer surface of the sealing plate 14 may be made of aluminum or an aluminum alloy.

As shown in FIG. 1, a positive electrode external conductive member 32 and a negative electrode external conductive member 42, which have plate shapes, are attached to the outer surface of the sealing plate 14. The positive electrode external conductive member 32 is electrically connected to the positive electrode terminal 30. The negative electrode external conductive member 42 is electrically connected to the negative electrode terminal 40. The positive electrode external conductive member 32 and the negative electrode external conductive member 42 are members to which bus bars are attached when a plurality of batteries 100 are electrically connected to each other. The positive electrode external conductive member 32 and the negative electrode external conductive member 42 are preferably made of a metal, and more preferably made of, for example, aluminum or an aluminum alloy. The positive electrode external conductive member 32 and the negative electrode external conductive member 42 are insulated from the sealing plate 14 by external insulating members 92. However, the positive electrode external conductive member 32 and the negative electrode external conductive member 42 are not essential and may be omitted in other embodiments.

Figure 5:
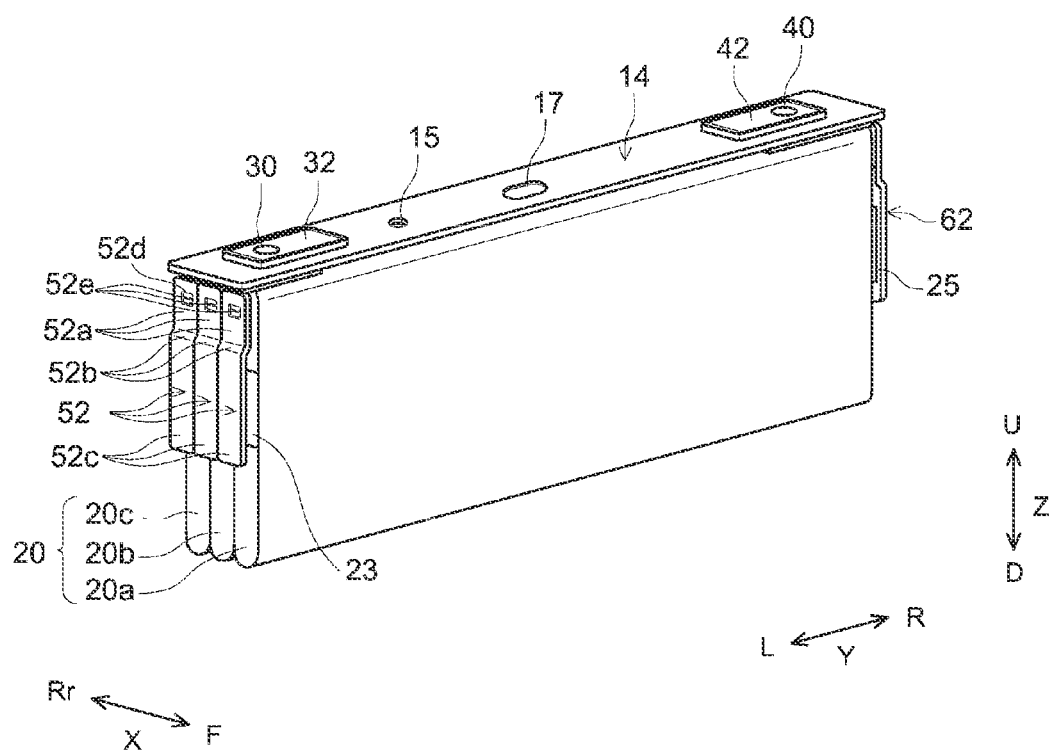
FIG. 5 is a perspective view schematically showing electrode body groups attached to a sealing plate.

FIG. 5 is a perspective view schematically showing the electrode body group 20 attached to the sealing plate 14. The electrode body group 20 has three wound electrode bodies 20a, 20b, and 20c here. However, the number of wound electrode bodies disposed inside one exterior body 12 is not particularly limited, and may be two or more (plural) or one. The electrode body group 20 is disposed inside the exterior body 12 in a state in which it is covered with an electrode body holder 29 (see FIG. 3) made of a resin sheet.

Figure 6:
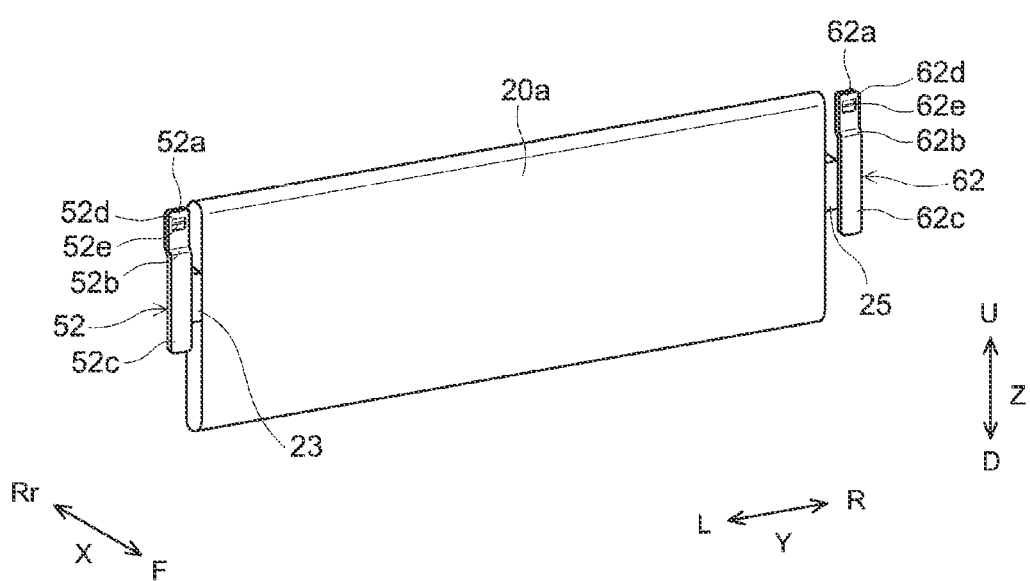
FIG. 6 is a perspective view schematically showing an electrode body to which a second positive electrode current collecting unit and a second negative electrode current collecting unit are attached.

FIG. 6 is a perspective view schematically showing the wound electrode body 20a. Also, although the wound electrode body 20a will be described in detail below as an example, the wound electrode bodies 20b and 20c can also have the same configuration. The wound electrode body 20a is disposed inside the exterior body 12 in a direction in which a winding axis WL is substantially parallel to the long side direction Y. The wound electrode body 20a is disposed inside the exterior body 12 such that the winding axis WL is along the bottom wall 12a and the sealing plate 14. The wound electrode body 20a is disposed inside the exterior body 12 in a direction in which the winding axis WL is orthogonal to the short side wall 12c. An end surface of the wound electrode body 20a orthogonal to the winding axis WL (in other words, a laminated surface on which the positive electrode 22 and the negative electrode 24 are laminated) faces the short side wall 12c. The long side direction Y is an example of the winding axis direction.

As shown in FIG. 3, the wound electrode body 20a has a pair of curved portions (R portions) 20r that face the bottom wall 12a of the exterior body 12 and the sealing plate 14, and a flat portion 20f that connects the pair of curved portions 20r and faces the long side wall 12b of the exterior body 12. Here, the curved portion 20r on one side (the upper side of FIG. 3) indirectly faces the sealing plate 14 via a first positive electrode current collecting unit 51, a first negative electrode current collecting unit 61, the positive electrode insulating member 70, the negative electrode insulating member 80, and the like, which will be described later. The curved portion 20r on the other side (the lower side of FIG. 3) here indirectly faces the bottom wall 12a via the electrode body holder 29.

Figure 7:
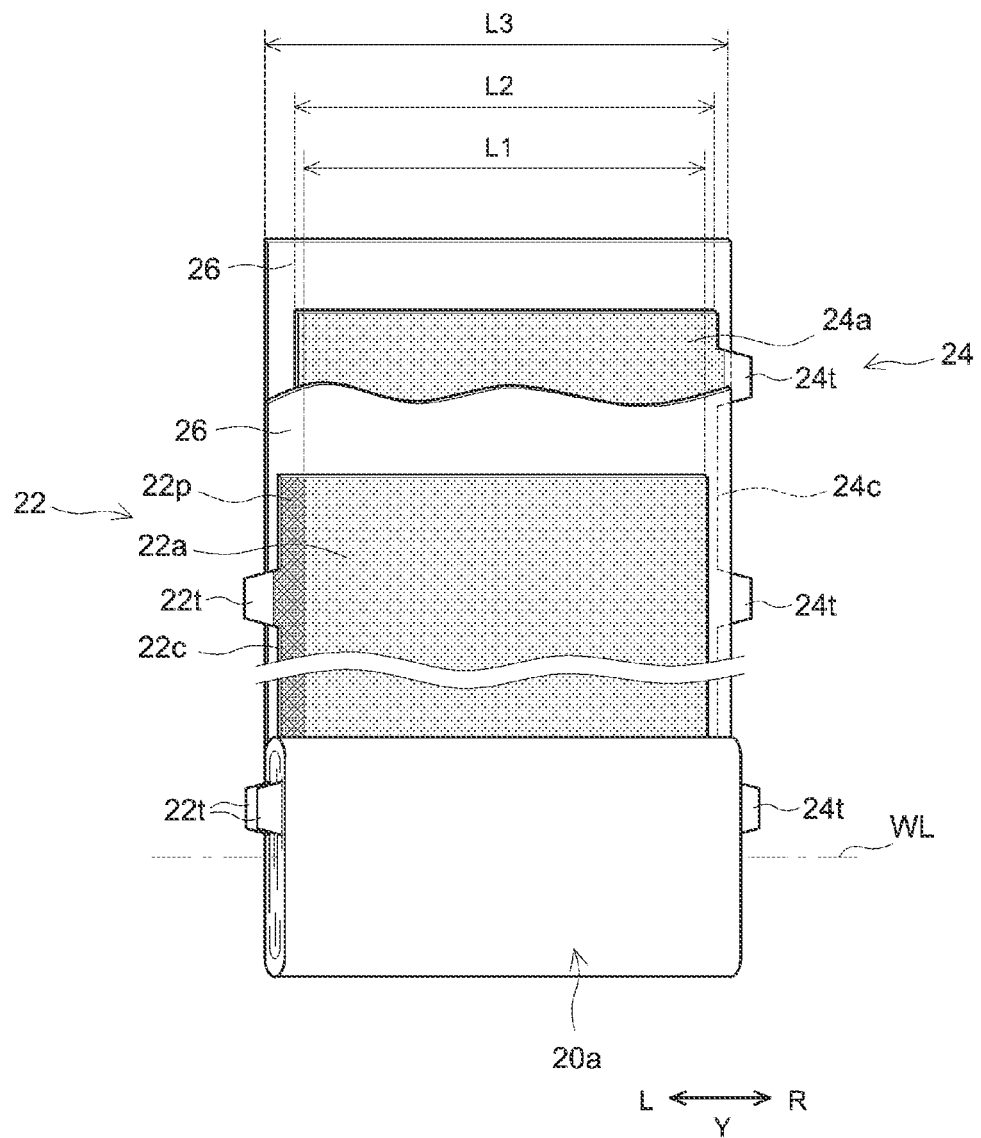
FIG. 7 is a schematic view showing a configuration of a wound electrode body.
Figure 8:
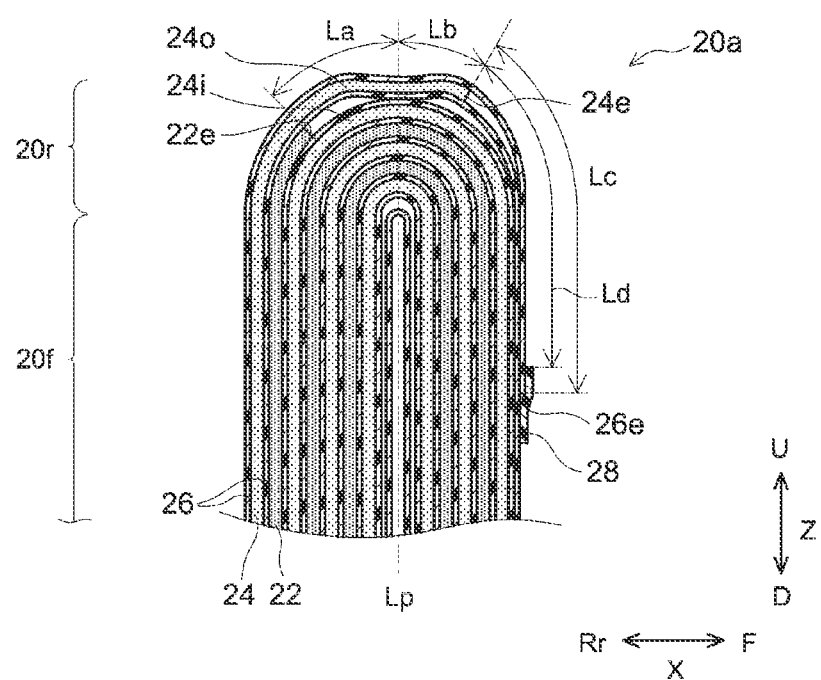
FIG. 8 is a partially enlarged cross-sectional view schematically showing an upper end portion of the wound electrode body of FIG. 3.
Figure 9A:
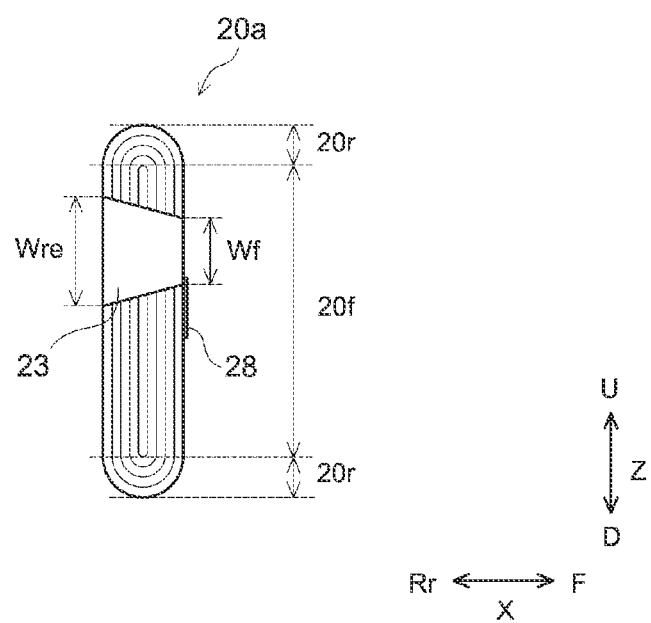
FIG. 9A is a side view schematically showing the wound electrode body of FIG. 7.
Figure 9B:
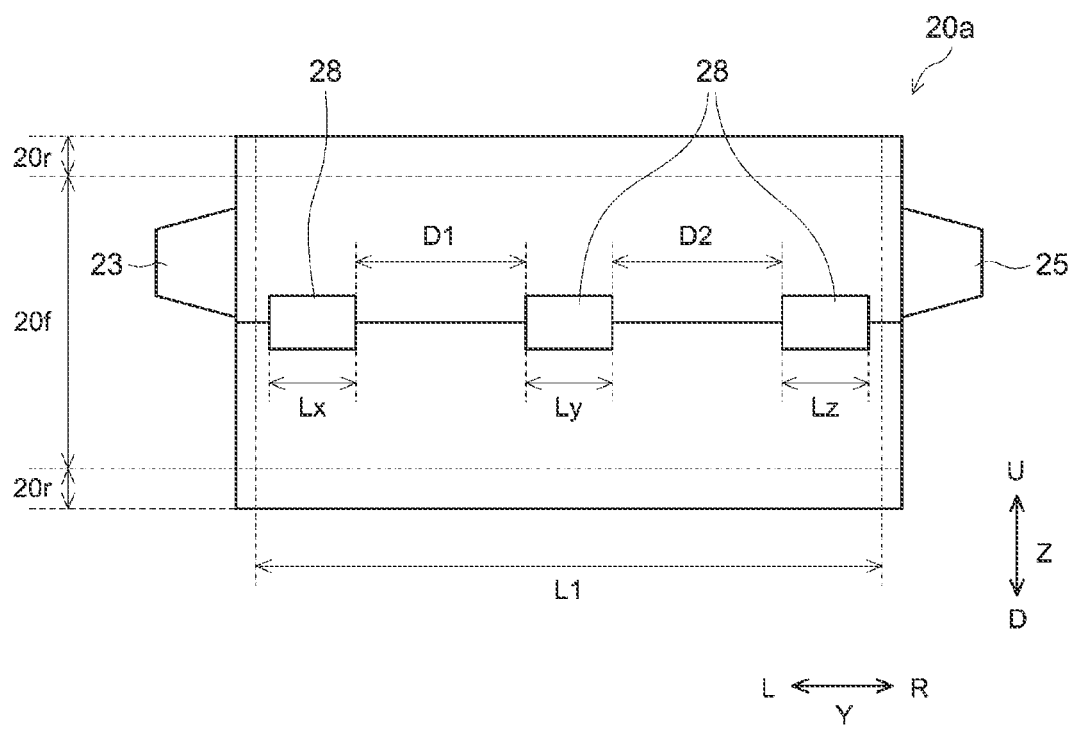
FIG. 9B is a front view schematically showing the wound electrode body of FIG. 7.

FIG. 7 is a schematic view showing a configuration of the wound electrode body 20a. The wound electrode body 20a has the positive electrode 22, the negative electrode 24, and a separator 26. Here, the wound electrode body 20a is configured such that the band-shaped positive electrode 22 and the band-shaped negative electrode 24 are laminated via the band-shaped separator 26 and wound around the winding axis WL. The wound electrode body 20a has a flat shape. It is particularly preferable that the wound electrode body 20a have such a flat shape. FIG. 8 is a partially enlarged cross-sectional view schematically showing an upper end portion of the wound electrode body 20a. FIG. 8 shows a cross-section of the wound electrode body 20a in a direction orthogonal to the winding axis WL. Also, in FIG. 8, a positive electrode tab group 23 and a negative electrode tab group 25, which will be described later, are not shown. FIG. 9A is a side view schematically showing the wound electrode body 20a. FIG. 9A shows a side surface (an end surface) of the wound electrode body 20a in the direction orthogonal to the winding axis WL. FIG. 9B is a front view schematically showing the wound electrode body 20a. FIG.

9B shows the side surface of the wound electrode body 20a in the direction along the winding axis WL.

As shown in FIG. 7, the positive electrode 22 has a positive electrode current collecting body 22c, and a positive electrode active material layer 22a and a positive electrode protective layer 22p that are fixed on at least one surface of the positive electrode current collecting body 22c. However, the positive electrode protective layer 22p is not essential and may be omitted in other embodiments. The positive electrode current collecting body 22c has a band shape. The positive electrode current collecting body 22c is made of a conductive metal such as aluminum, an aluminum alloy, nickel, or stainless steel. The positive electrode current collecting body 22c here is a metal foil, specifically an aluminum foil.

A plurality of positive electrode tabs 22t are provided at one end portion (a left end portion in FIG. 7) of the positive electrode current collecting body 22c in the long side direction Y. The plurality of positive electrode tabs 22t protrude toward one side (a left side in FIG. 7) in the long side direction Y. The plurality of positive electrode tabs 22t protrude from the separator 26 in the long side direction Y. The plurality of positive electrode tabs 22t are provided at intervals (intermittently) in the longitudinal direction of the positive electrode 22. The positive electrode tab 22t is a part of the positive electrode current collecting body 22c here, and is made of a metal foil (aluminum foil). The positive electrode tab 22t is a portion (current collecting body exposed portion) in which the positive electrode active material layer 22a and the positive electrode protective layer 22p of the positive electrode current collecting body 22c are not formed. However, the positive electrode tab 22t may be a member different from the positive electrode current collecting body 22c. Further, the positive electrode tabs 22t may be provided at the other end portion (a right end portion in FIG. 7) in the long side direction Y, or may be provided at both end portions in the long side direction Y.

As shown in FIG. 4, the plurality of positive electrode tabs 22t are laminated at one end portion (a left end portion in FIG. 4) in the long side direction Y to form the positive electrode tab group 23. The plurality of positive electrode tabs 22t are bent and curved so that the outer ends thereof are aligned. The positive electrode tab group 23 is electrically connected to the positive electrode terminal 30 via the positive electrode current collecting unit 50. It is preferable that the plurality of positive electrode tabs 22t be bent and electrically connected to the positive electrode terminal 30. The positive electrode tab group 23 is provided with a second positive electrode current collecting unit 52, which will be described later. Sizes of the plurality of positive electrode tabs 22t (lengths in the long side direction Y and widths in a direction orthogonal to the long side direction Y, see FIG. 7) can be appropriately adjusted in consideration of a state in which they are connected to the positive electrode current collecting unit 50, for example, depending on formation positions thereof and the like.

As shown in FIG. 9A, the positive electrode tab group 23 is eccentrically disposed on the sealing plate 14 side in the vertical direction Z (the direction perpendicular to the sealing plate 14). The positive electrode tab group 23 is disposed closer to the sealing plate 14 than the bottom wall 12a of the exterior body 12. The plurality of positive electrode tabs 22t here are different in size from each other so that the outer ends are aligned when curved. In the short side direction X, a width Wre of the positive electrode tab 22t located at one end (a left end in FIG. 9A) is wider than a width Wf of the positive electrode tab 22t located at the other end (a right end in FIG. 9A). In the positive electrode tab group 23, the sizes of the plurality of positive electrode tabs 22t are adjusted such that heights and widths of the positive electrode tabs 22t gradually increase from one side (a left side in FIG. 9A) to the other side (a right side in FIG. 9A) in the short side direction X.

As shown in FIG. 7, the positive electrode active material layer 22a is provided in a band shape in the longitudinal direction of the band-shaped positive electrode current collecting body 22c. The positive electrode active material layer 22a contains a positive electrode active material (for example, a lithium transition metal composite oxide such as a lithium nickel cobalt manganese composite oxide) capable of reversibly storing and discharging charge carriers. When the total solid content of the positive electrode active material layer 22a is 100% by mass, the positive electrode active material may occupy approximately 80% by mass or more, and typically 90% by mass or more, for example, 95% by mass or more. The positive electrode active material layer 22a may contain optional components other than the positive electrode active material, for example, a conductive material, a binder, various additive components, and the like. For the conductive material, a carbon material such as acetylene black (AB) can be used. For the binder, for example, polyvinylidene fluoride (PVdF) or the like can be used. For high-capacity type batteries used for in-vehicle use and the like, a length L1 of the positive electrode active material layer 22a in the long side direction Y may be approximately 15 cm or more, for example, 20 cm or more, and further 25 cm or more.

As shown in FIG. 7, the positive electrode protective layer 22p is provided at a boundary portion between the positive electrode current collecting body 22c and the positive electrode active material layer 22a in the long side direction Y. The positive electrode protective layer 22p here is provided at one end portion (a left end portion in FIG. 7) of the positive electrode current collecting body 22c in the long side direction Y. However, the positive electrode protective layer 22p may be provided at both end portions in the long side direction Y. The positive electrode protective layer 22p is provided in a band shape along the positive electrode active material layer 22a. The positive electrode protective layer 22p contains an inorganic filler (for example, alumina). When the total solid content of the positive electrode protective layer 22p is 100% by mass, the inorganic filler may occupy approximately 50% by mass or more, and typically 70% by mass or more, for example, 80% by mass or more. The positive electrode protective layer 22p may contain optional components other than the inorganic filler, for example, a conductive material, a binder, various additive components, and the like. The conductive material and the binder may be the same as those exemplified as being able to be contained in the positive electrode active material layer 22a.

As shown in FIG. 7, the negative electrode 24 has a negative electrode current collecting body 24c, and a negative electrode active material layer 24a fixed on at least one surface of the negative electrode current collecting body 24c. The negative electrode current collecting body 24c has a band shape. The negative electrode current collecting body 24c is made of a conductive metal such as copper, a copper alloy, nickel, or stainless steel. The negative electrode current collecting body 24c here is a metal foil, specifically a copper foil.

A plurality of negative electrode tabs 24t are provided at one end portion (a right end portion in FIG. 7) of the negative electrode current collecting body 24c in the long side direction Y. The plurality of negative electrode tabs 24*t* protrude toward one side (a right side in FIG. 7) in the long side direction Y. The plurality of negative electrode tabs 24*t* protrude from the separator 26 in the long side direction Y. The plurality of negative electrode tabs 24*t* protrude from the separator 26 in the long side direction Y. The plurality of negative electrode tabs 24*t* are provided at intervals (intermittently) in the longitudinal direction of the negative electrode 24. The negative electrode tab 24*t* is a part of the negative electrode current collecting body 24*c* here, and is made of a metal foil (copper foil). Here, the negative electrode tab 24*t* is a portion (a current collecting body exposed portion) of the negative electrode current collecting body 24*c* in which the negative electrode active material layer 24*a* is not formed. However, the negative electrode tab 24*t* may be a member different from the negative electrode current collecting body 24*c*. Further, the negative electrode tabs 24*t* may be provided at the other end portion (a left end portion in FIG. 7) in the long side direction Y, or may be provided at both end portions in the long side direction Y.

As shown in FIG. 4, the plurality of negative electrode tabs 24*t* are laminated at one end portion (a right end portion in FIG. 6) in the long side direction Y to form the negative electrode tab group 25. The negative electrode tab group 25 is provided at a position symmetrical to the positive electrode tab group 23 in the long side direction Y. The plurality of negative electrode tabs 24*t* are bent and curved so that outer ends thereof are aligned. The negative electrode tab group 25 is electrically connected to the negative electrode terminal 40 via the negative electrode current collecting unit 60. It is preferable that the plurality of negative electrode tabs 24*t* are bent and electrically connected to the negative electrode terminal 40. The negative electrode tab group 25 is provided with a second negative electrode current collecting unit 62, which will be described later. Sizes (lengths in the long side direction Y and widths in a direction orthogonal to the long side direction Y, see FIG. 7) of the plurality of negative electrode tabs 24*t* can be appropriately adjusted in consideration of a state in which they are connected to the negative electrode current collecting unit 60, for example, depending on formation positions thereof and the like.

The negative electrode tab group 25 is disposed at the same position as the positive electrode tab group 23 in the vertical direction Z. Although not shown, the negative electrode tab group 25 is eccentrically disposed on the sealing plate 14 side in the vertical direction Z, similarly to the positive electrode tab group 23. The plurality of negative electrode tabs 24*t* here are different in size from each other so that the outer ends are aligned when curved. In the negative electrode tab group 25, similarly to the positive electrode tab group 23, the sizes of the plurality of negative electrode tabs 24*t* are adjusted such that heights and widths of the negative electrode tabs 24*t* gradually increase from one side to the other side in the short side direction X.

As shown in FIG. 7, the negative electrode active material layer 24*a* is provided in a band shape in the longitudinal direction of the band-shaped negative electrode current collecting body 24*c*. The negative electrode active material layer 24*a* contains a negative electrode active material (for example, a carbon material such as graphite) capable of reversibly storing and discharging charge carriers. When the total solid content of the negative electrode active material layer 24*a* is 100% by mass, the negative electrode active material may occupy approximately 80% by mass or more, and typically 90% by mass or more, for example, 95% by mass or more. The negative electrode active material layer 24*a* may contain optional components other than the negative electrode active material, such as a binder, a dispersant, and various additive components. For the binder, rubbers such as styrene-butadiene rubber (SBR) can be used. For the dispersant, cell rolls such as carboxymethyl cellulose (CMC) can be used. In the long side direction Y, a length L2 of the negative electrode active material layer 24*a* is longer than a length L1 of the positive electrode active material layer 22*a*.

The separator 26 is a member that insulates the positive electrode active material layer 22*a* of the positive electrode 22 and the negative electrode active material layer 24*a* of the negative electrode 24. The separator 26 constitutes the outer surface of the wound electrode body 20*a* here. For the separator 26, for example, a porous resin sheet made of a polyolefin resin such as polyethylene (PE) or polypropylene (PP) is suitable. The separator 26 preferably has a separator base material portion made of a porous resin sheet, and a heat resistance layer (HRL) formed on at least one surface of the separator base material portion. The heat resistance layer is a layer containing an inorganic filler. For the inorganic filler, for example, alumina, boehmite, aluminum hydroxide, titania, or the like can be used. In the long side direction Y, a length L3 of the separator 26 is longer than a length L2 of the negative electrode active material layer 24*a*.

As shown in FIG. 8, a winding end 22*e* of the positive electrode 22 is disposed on an inner peripheral wound side with respect to the winding end 24*e* of the negative electrode 24. The winding end 22*e* of the positive electrode 22 here is located at the curved portion 20*r* facing the sealing plate 14. The winding end 22*e* of the positive electrode 22 here is disposed on the inner peripheral wound side than a straight line Lp perpendicular to the bottom wall 12*a* and the winding axis WL of the wound electrode body 20*a*. In FIG. 8, a length La from the winding end 22*e* of the positive electrode 22 to the straight line Lp is preferably 0.1 mm to 20 mm, more preferably 0.1 mm to 9 mm, and further preferably 3 mm to 7 mm. The length La may be 5 mm or more.

The winding end 24*e* of the negative electrode 24 is disposed on an outer peripheral wound side with respect to the winding end 22*e* of the positive electrode 22. The winding end 24*e* of the negative electrode 24 here is located at the curved portion 20*r* facing the sealing plate 14. The winding end 24*e* of the negative electrode 24 here is disposed on the outer peripheral wound side with respect to the straight line Lp (in other words, a position beyond the straight line Lp). In FIG. 8, a length Lb from the straight line Lp to the winding end 24*e* of the negative electrode 24 is preferably 0.1 mm to 20 mm, more preferably 0.1 mm to 9 mm, and further preferably 3 mm to 7 mm. The length Lb may be 4 mm or more. In the curved portion 20*r*, a portion 24*o* located on the outermost peripheral portion of the negative electrode 24 faces a portion 24*i* located on the inner peripheral wound side of the negative electrode 24 via the separator 26.

A winding end 26*e* of the separator 26 is disposed on the outer peripheral wound side with respect to the winding end 22*e* of the positive electrode 22 and the winding end 24*e* of the negative electrode 24. The winding end 26*e* of the separator 26 here is located at the flat portion 20*f* of the wound electrode body 20*a*. When the winding end 26*e* is located on the flat portion 20*f*, it is possible to effectively inhibit variations in thicknesses (lengths in the short side direction X in FIG. 8) of the plurality of wound electrode bodies 20*a*, 20*b*, and 20*c*. In FIG. 8, a length Lc from the winding end 24*e* of the negative electrode 24 to the winding end 26e of the separator 26 may be longer than the total length (La+Lb) of the length La and the length Lb. The length Lc is preferably 20 mm to 100 mm, more preferably 30 mm to 80 mm or more, and further preferably 40 mm to 60 mm.

A plurality of winding stop tapes 28 are attached to the winding end 26e of the separator 26 (see FIG. 9B). The plurality of winding stop tapes 28 are attached to the outer surface of the wound electrode body 20a. The plurality of winding stop tapes 28 are attached to bridge one separator 26 and the other separator 26. In FIG. 8, a length Ld from the winding end 24e of the negative electrode to the winding stop tape 28 is preferably 20 to 70 mm, and more preferably 25 to 45 mm. As shown in FIG. 9A, in the short side direction X, the plurality of winding stop tapes 28 here are located closer to the (narrow) positive electrode tab 22t having the width Wf than the (wide) positive electrode tab 22t having the width Wre. Thus, the winding slack of the wound electrode body 20a can be better prevented.

As shown in FIGS. 8 and 9B, the entire area of the plurality of winding stop tapes 28 is disposed on the flat portion 20f not to cover the curved portion 20r. Thus, the thickness of the wound electrode body 20a (the length in the short side direction X in FIGS. 8 and 9B) can be inhibited as compared with a case in which the winding end 26e is disposed in the curved portion 20r. Further, it is possible to prevent a boundary between the flat portion 20f and the curved portion 20r from becoming thicker. In addition, it is possible to inhibit the occurrence of variations in the thicknesses of the plurality of wound electrode bodies 20a, 20b, and 20c, and it is possible to charge and discharge the plurality of wound electrode bodies 20a, 20b, and 20c in a well-balanced manner.

As shown in FIG. 9B, the plurality of winding stop tapes 28 are attached in line shapes at predetermined intervals D1 and D2 along the winding axis WL of the wound electrode body 20a in the long side direction Y. In the long side direction Y, the plurality of winding stop tapes 28 are disposed between the positive electrode tab group 23 and the negative electrode tab group 25. The plurality of winding stop tapes 28 here are disposed on a straight line connecting the positive electrode tab group 23 and the negative electrode tab group 25. The plurality of winding stop tapes 28 are disposed closer to a central side of the wound electrode body than the positive electrode tab group 23 and the negative electrode tab group 25. The plurality of winding stop tapes 28 here are disposed within the range of the length L1 of the positive electrode active material layer 22a.

The plurality of winding stop tapes 28 are attached at intervals D1 and D2 (separately) in the long side direction Y, and thus it is possible to inhibit the occurrence of wrinkles on the winding stop tapes 28 even in a case in which the length of the wound electrode body 20a in the long side direction Y is long. During a manufacturing process (for example, an activation step described later) or usage of the battery, the pair of long side walls 12b of the battery 100 may be sandwiched by a restraining mechanism, and the battery 100 may be pressed in the long side direction Y. In such a case, by inhibiting the wrinkles of the winding stop tapes 28, it is possible to inhibit a local increase in the thickness of the wound electrode body 20a (the length of the short side direction X in FIG. 9B). Thus, it is possible to uniformly press the wound electrode body 20a in the long side direction Y and inhibit a large pressure from being locally applied. As a result, an uneven reaction is less likely to occur during charging and discharging, and it is possible to inhibit generation of dendrite.

Further, in order to stabilize charging and discharging characteristics of the battery 100, it is preferable that the battery case 10 put a pressure on the flat portion 20f of the flat wound electrode body 20a. In this case, a relatively large pressure is applied to a portion to which the winding stop tapes 28 are attached as compared with a portion to which the winding stop tapes 28 are not attached. Thus, in the long side direction Y, the electrolytic solution is less likely to move in the portion to which the winding stop tapes 28 are attached. In particular, it is less likely to move in the vertical direction Z. Such a tendency is particularly remarkable in an assembled battery formed by arranging a plurality of batteries 100 in the short side direction X and applying a load thereto in the short side direction X using a restraining mechanism. Therefore, as in the technique disclosed herein, by separately attaching the plurality of winding stop tapes 28, it is possible to relatively promote the diffusion of the electrolytic solution (movement of a liquid during charging and discharging, especially the diffusion of the electrolytic solution in the vertical direction Z) inside the wound electrode body 20a as compared with the case of attach one linear winding stop tape. Thus, the plurality of wound electrode bodies 20a, 20b, and 20c can be charged and discharged better (in a well-balanced manner). Accordingly, the technique disclosed herein provides a particularly excellent effect.

The winding stop tape 28 preferably has a tape base material portion and an adhesive layer formed on a surface of the tape base material portion. For the tape base material portion, for example, a film made of a resin such as polyethylene terephthalate (PET), polybutylene terephthalate (PBT), polyethylene naphthalate (PEN), polyvinyl chloride, polypropylene (PP), polyarylate, polyurethane, polycarbonate, polyamide, polyimide (PI), polyphenylene sulfide (PPS), or polyethylene tetrafluoride, a composite thereof, or the like can be used. The adhesive layer is a layer containing an adhesive. For the adhesive, for example, a rubber-based adhesive, a silicone-based adhesive, an acrylic-based adhesive, an acrylate-based adhesive, or the like may be used. Among them, it is preferable to contain an acrylic and/or rubber-based adhesive.

Each of the plurality of winding stop tapes 28 here has a rectangular shape having long sides and short sides. Each of the plurality of winding stop tapes 28 is disposed so that the long sides of the rectangular shape are in the long side direction Y. Lengths Lx, Ly, and Lz of the long sides (lengths in the long side direction Y, in other words, in the direction along the winding axis WL) of the plurality of winding stop tapes 28 may be substantially the same (for example, approximately within ±50%, for example, within ±25% from an arithmetic mean value of the lengths Lx, Ly, and Lz) or may be different from each other. Further, lengths of the short sides (lengths in the vertical direction Z, in other words, in the direction orthogonal to the winding axis WL) of the plurality of winding stop tapes 28 may be substantially the same (for example, approximately within ±50%, for example, within ±25% from the arithmetic mean value of lengths Lx, Ly, and Lz) or may be different from each other. Each of the lengths of the short sides of the winding stop tape 28 may be 20±10 mm.

In the long side direction Y, when the length L1 of the positive electrode active material layer 22a is 100%, a proportion of the total length (Lx+Ly+Lz) of the plurality of winding stop tapes 28 is preferably 20 to 70%, and more preferably 30 to 50%. By setting the total length to a predetermined proportion or more, it is possible to better inhibit the occurrence of twisting and wrinkles when the winding stop tapes 28 are attached. Further, by setting the total length to the predetermined proportion or less, it is possible to prevent the intervals D1 and D2 between the winding stop tapes 28 from being too wide. Thus, it is possible to inhibit wrinkles of the wound electrode body 20a due to the winding stop tapes 28 being peeled off or the separator 26 being turned over. Accordingly, it is possible to prevent or inhibit an uneven reaction during charging and discharging, generation of dendrite, and the like at a high level.

In the long side direction Y, the intervals D1 and D2 between the plurality of adjacent winding stop tapes 28 are preferably 30 mm to 105 mm, and more preferably 60 mm to 90 mm By setting the intervals D1 and D2 to a predetermined proportion or more, it is possible to better inhibit the occurrence of twisting and wrinkles when the winding stop tapes 28 are attached. Further, by setting the intervals D1 and D2 to the predetermined proportion or less, it is possible to inhibit the wound electrode body 20a from being wrinkled due to the winding stop tapes 28 being peeled off or the separator 26 being turned over. Accordingly, it is possible to prevent or inhibit an uneven reaction during charging and discharging, generation of dendrite, and the like at a high level.

The electrolytic solution may be the same as conventional one, and there is no particular limitation. The electrolytic solution is, for example, a non-aqueous electrolytic solution containing a non-aqueous solvent and a supporting salt. The non-aqueous solvent contains, for example, carbonates such as ethylene carbonate, dimethyl carbonate, and ethyl methyl carbonate. The supporting salt is, for example, a fluorine-containing lithium salt such as $LiPF_6$. However, the electrolytic solution may be in a solid state (solid electrolyte) and integrated with the electrode body group 20.

The positive electrode current collecting unit 50 constitutes a conduction path that electrically connects the positive electrode tab group 23 configured of the plurality of positive electrode tabs 22t to the positive electrode terminal 30. As shown in FIG. 2, the positive electrode current collecting unit 50 includes a first positive electrode current collecting unit 51 and a second positive electrode current collecting unit 52. The first positive electrode current collecting unit 51 and the second positive electrode current collecting unit 52 may be made of the same metal type as the positive electrode current collecting body 22c, for example, a conductive metal such as aluminum, an aluminum alloy, nickel, or stainless steel.

Figure 10:
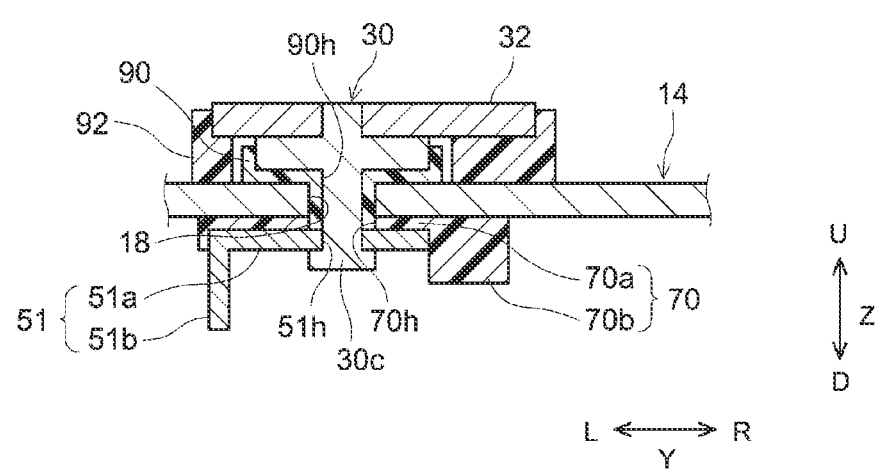
FIG. 10 is a partially enlarged cross-sectional view schematically showing the vicinity of a positive electrode terminal of FIG. 2.
Figure 11:
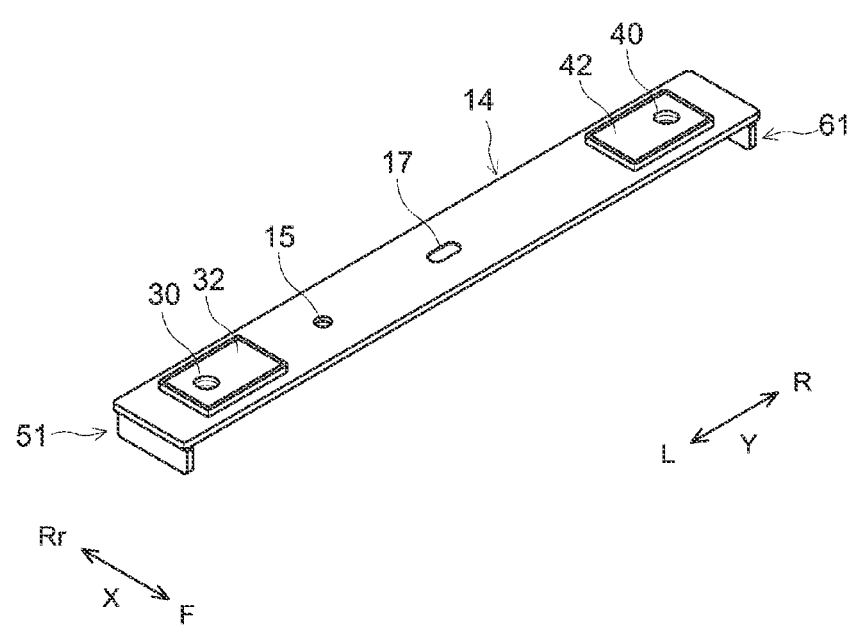
FIG. 11 is a perspective view schematically showing a sealing plate to which a positive electrode terminal, a negative electrode terminal, a first positive electrode current collecting unit, a first negative electrode current collecting unit, a positive electrode insulating member, and a negative electrode insulating member are attached.
Figure 12:
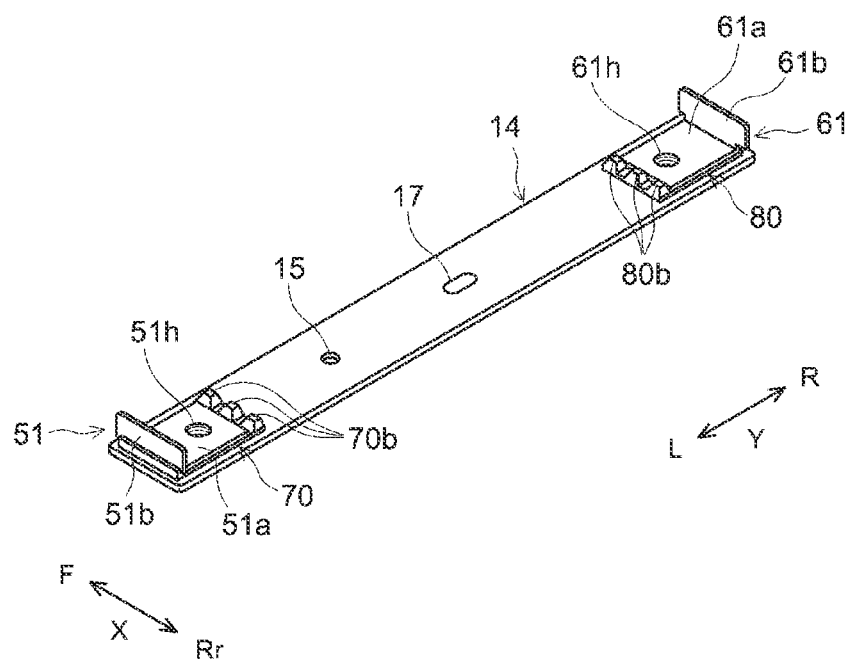
FIG. 12 is a perspective view of the sealing plate of FIG. 11 turned inside out.

FIG. 10 is a partially enlarged cross-sectional view schematically showing the vicinity of the positive electrode terminal 30 of FIG. 2. FIG. 11 is a perspective view schematically showing the sealing plate 14. FIG. 12 is a perspective view of the sealing plate of FIG. 11 turned inside out. FIG. 12 shows a side (inner) surface of the exterior body 12 of the sealing plate 14. As shown in FIGS. 10 to 12, the first positive electrode current collecting unit 51 is attached to an inner surface of the sealing plate 14. The first positive electrode current collecting unit 51 has a first region 51a and a second region 51b. The first positive electrode current collecting unit 51 may be configured by bending one member by, for example, press working, or may be configured by integrating a plurality of members by welding or the like. The first positive electrode current collecting unit 51 here is fixed to the sealing plate 14 by caulking.

The first region 51a is a portion disposed between the sealing plate 14 and the electrode body group 20. The first region 51a extends in the long side direction Y. The first region 51a extends horizontally along the inner surface of the sealing plate 14. The positive electrode insulating member 70 is disposed between the sealing plate 14 and the first region 51a. The first region 51a is insulated from the sealing plate 14 by the positive electrode insulating member 70. Here, the first region 51a is electrically connected to the positive electrode terminal 30 by caulking. In the first region 51a, a through hole 51h penetrating in the vertical direction Z is formed at a position corresponding to the terminal lead-out hole 18 of the sealing plate 14. The second region 51b is a portion disposed between the short side wall 12c of the exterior body 12 and the electrode body group 20. The second region 51b extends from one end (a left end in FIG. 10) in the long side direction Y of the first region 51a toward the short side wall 12c of the exterior body 12. The second region 51b extends in the vertical direction Z.

The second positive electrode current collecting unit 52 extends along the short side wall 12c of the exterior body 12. As shown in FIG. 6, the second positive electrode current collecting unit 52 has a current collecting plate connection portion 52a, an inclined portion 52b, and a tab joint portion 52c. The current collecting plate connection portion 52a is a portion that is electrically connected to the first positive electrode current collecting unit 51. The current collecting plate connection portion 52a extends in the vertical direction Z. The current collecting plate connection portion 52a is disposed substantially perpendicular to the winding axis WL of the wound electrode bodies 20a, 20b, and 20c. The current collecting plate connection portion 52a is provided with a recessed portion 52d having a thickness thinner than a periphery thereof. The recessed portion 52d is provided with a through hole 52e penetrating in the short side direction X. A joint portion with the first positive electrode current collecting unit 51 is formed in the through hole 52e. The joint portion is a welded joint portion formed by welding such as ultrasonic welding, resistance welding, laser welding, or the like. A fuse may be provided in the second positive electrode current collecting unit 52.

The tab joint portion 52c is a portion attached to the positive electrode tab group 23 and electrically connected to the plurality of positive electrode tabs 22t. As shown in FIGS. 5 and 6, the tab joint portion 52c extends in the vertical direction Z. The tab joint portion 52c is disposed substantially perpendicular to the winding axis WL of the wound electrode bodies 20a, 20b, and 20c. A surface of the tab joint portion 52c connected to the plurality of positive electrode tabs 22t is disposed substantially parallel to the short side wall 12c of the exterior body 12. As shown in FIG. 4, a joint portion J with the positive electrode tab group 23 is formed in the tab joint portion 52c. The joint portion J is, for example, a welded joint formed by welding such as ultrasonic welding, resistance welding, or laser welding in a state in which the plurality of positive electrode tabs 22t are stacked. In the welded joint portion, the plurality of positive electrode tabs 22t are disposed closer to one sides of the wound electrode bodies 20a, 20b, and 20c in the short side direction X. Thus, the plurality of positive electrode tabs 22t can be more preferably bent to stably form the curved positive electrode tab group 23 as shown in FIG. 4.

The inclined portion 52b is a portion that connects a lower end of the current collecting plate connection portion 52a and an upper end of the tab joint portion 52c. The inclined portion 52b is inclined with respect to the current collecting plate connection portion 52a and the tab joint portion 52c. The inclined portion 52b connects the current collecting plate connection portion 52a to the tab joint portion 52c so that the current collecting plate connection portion 52a is located closer to the central side than the tab joint portion 52c in the long side direction Y. Thus, an accommodation space of the electrode body group 20 can be widened to achieve a higher energy density of the battery 100. A lower end of the inclined portion 52b (in other words, an end portion of the exterior body 12 on the bottom wall 12a side) is preferably located below the lower end of the positive electrode tab group 23. As a result, the plurality of positive electrode tabs 22t can be more preferably bent to stably form the curved positive electrode tab group 23 as shown in FIG. 4.

The negative electrode current collecting unit 60 constitutes a conduction path that electrically connects the negative electrode tab group 25 configured of the plurality of negative electrode tabs 24t to the negative electrode terminal 40. As shown in FIG. 2, the negative electrode current collecting unit 60 includes the first negative electrode current collecting unit 61 and the second negative electrode current collecting unit 62. The first negative electrode current collecting unit 61 and the second negative electrode current collecting unit 62 may be made of the same metal type as the negative electrode current collecting body 24c, for example, a conductive metal such as copper, a copper alloy, nickel, or stainless steel. Configurations of the first negative electrode current collecting unit 61 and the second negative electrode current collecting unit 62 may be the same as those of the first positive electrode current collecting unit 51 and the second positive electrode current collecting unit 52 of the positive electrode current collecting unit 50.

As shown in FIG. 12, the first negative electrode current collecting unit 61 has a first region 61a and a second region 61b. The negative electrode insulating member 80 is disposed between the sealing plate 14 and the first region 61a. The first region 61a is insulated from the sealing plate 14 by the negative electrode insulating member 80. In the first region 51a, a through hole 61h penetrating in the vertical direction Z is formed at a position corresponding to the terminal lead-out hole 19 of the sealing plate 14. As shown in FIG. 6, the second negative electrode current collecting unit 62 has a current collecting plate connection portion 62a electrically connected to the first negative electrode current collecting unit 61, an inclined portion 62b, and a tab joint portion 62c that is attached to the negative electrode tab group 25 and electrically connected to the plurality of negative electrode tabs 24t. The current collecting plate connection portion 62a has a recessed portion 62d connected to the tab joint portion 62c. The recessed portion 62d is provided with a through hole 62e penetrating in the short side direction X.

The positive electrode insulating member 70 is a member that insulates the sealing plate 14 and the first positive electrode current collecting unit 51. Also, although the positive electrode insulating member 70 will be described in detail below as an example, the negative electrode insulating member 80 may have the same configuration. The positive electrode insulating member 70 is made of a resin material that has resistance to the electrolytic solution used and electrical insulation and is capable of elastic deformation and is preferably made of, for example, a polyolefin resin such as polypropylene (PP), a fluorinated resin such as tetrafluoro ethylene-perfluoroalkoxyethylene copolymer (PFA), polyphenylene sulfide (PPS), or the like.

As shown in FIG. 2, the positive electrode insulating member 70 has a base portion 70a and a plurality of protruding portions 70b. The base portion 70a and the protruding portion 70b here are integrally molded. The positive electrode insulating member 70 is an integrally molded product obtained by integrally molding the resin material as described above. Thus, as compared with a case in which the base portion 70a and the protruding portion 70b are formed as separate members, the number of members used can be reduced, and reduction in cost can be realized. Further, the positive electrode insulating member 70 can be prepared more easily.

The base portion 70a is a portion disposed between the sealing plate 14 and the first region 51a of the first positive electrode current collecting unit 51 in the vertical direction Z. The base portion 70a extends horizontally along the first region 51a of the first positive electrode current collecting unit 51. As shown in FIG. 12, the base portion 70a has a through hole 70h penetrating in the vertical direction Z. The through hole 70h is formed at a position corresponding to the terminal lead-out hole 18 of the sealing plate 14.

Each of the plurality of protruding portions 70b protrudes toward the electrode body group 20 side with respect to the base portion 70a. As shown in FIG. 12, in the long side direction Y, the plurality of protruding portions 70b are provided on the central side (a right side of FIG. 12) of the sealing plate 14 with respect to the base portion 70a. The plurality of protruding portions 70b are disposed side by side in the short side direction X. As shown in FIG. 3, the plurality of protruding portions 70b are formed in a substantially U-shaped in cross-section. The plurality of protruding portions 70b here face the curved portions 20r of the wound electrode bodies 20a, 20b, and 20c constituting the electrode body group 20. Thus, it is possible to prevent the end surfaces of the wound electrode bodies 20a, 20b, and 20c from being pressed by the protruding portions 70b and being damaged.

Here, the number of protruding portions 70b is the same as the number of the wound electrode bodies 20a, 20b, and 20c constituting the electrode body group 20. That is, there are three protruding portions. Thus, the wound electrode bodies 20a, 20b, and 20c and the protruding portions 70b can be more reliably opposed to each other, and the effects of the technique disclosed herein can be better exhibited. Further, in the insertion step described later, the wound electrode bodies 20a, 20b, and 20c and the protruding portions 70b can be brought into contact with each other in a well-balanced manner. However, the number of protruding portions 70b may be different from the number of electrode bodies constituting the electrode body group 20, and may be, for example, one.

As shown in FIG. 2, the negative electrode insulating member 80 is disposed in symmetry with the positive electrode insulating member 70 with respect to a center CL of the electrode body group 20 in the long side direction Y. The configuration of the negative electrode insulating member 80 may be the same as that of the positive electrode insulating member 70. The negative electrode insulating member 80 here has a base portion 80a disposed between the sealing plate 14 and the first negative electrode current collecting unit 61, and a plurality of protruding portions 80b, similarly to the positive electrode insulating member 70.

The battery 100 preferably includes both the positive electrode insulating member 70 and the negative electrode insulating member 80. Thus, even if vibration, impact, or the like is applied when the battery 100 is used, the electrode body group 20 and the sealing plate 14 can be easily maintained in parallel (in the state of FIG. 2). Further, in the insertion step described later, the electrode body group 20 and the protruding portions 70b can be brought into better contact with each other (for example, in a well-balanced manner in the long side direction Y), and the electrode body group 20 can be stably pressed by the protruding portions 70b and inserted into the exterior body 12.

Manufacturing Method of Battery 100

A manufacturing method of the battery 100 is characterized by using the wound electrode bodies 20a, 20b, and 20c as described above. Other manufacturing processes may be the same as conventional ones. The battery 100 can be manufactured by a manufacturing method of preparing, in addition to the electrode body group 20 (wound electrode bodies 20a, 20b, and 20c), the battery case 10 (the exterior body 12 and the sealing plate 14), the electrolytic solution, the positive electrode terminal 30, the negative electrode terminal 40, the positive electrode current collecting unit 50 (the first positive electrode current collecting unit 51 and the second positive electrode collecting unit 52), the negative electrode current collecting unit 60 (the first negative electrode current collecting unit 61 and the second negative electrode current collecting unit 62), the positive electrode insulating member 70, and the negative electrode insulating member 80 as described above, and including, for example, a first attachment step, a second attachment step, the insertion step, a sealing step, and the activation step in order. In addition, the manufacturing method disclosed herein may further include other steps at any stage.

In the first attachment step, a first combined product as shown in FIGS. 11 and 12 is produced. Specifically, first, the positive electrode terminal 30, the first positive electrode current collecting unit 51, the positive electrode insulating member 70, the negative electrode terminal 40, the first negative electrode current collecting unit 61, and the negative electrode insulating member 80 are attached to the sealing plate 14.

The positive electrode terminal 30, the first positive electrode current collecting unit 51, and the positive electrode insulating member 70 are fixed to the sealing plate 14 by, for example, caulking (riveting). As shown in FIG. 10, the caulking is performed by sandwiching the gasket 90 between the outer surface of the sealing plate 14 and the positive electrode terminal 30 and sandwiching the positive electrode insulating member 70 between the inner surface of the sealing plate 14 and the first positive electrode current collecting unit 51. Also, a material of the gasket 90 may be the same as that of the positive electrode insulating member 70. Specifically, the positive electrode terminal 30 before caulking is inserted from above the sealing plate 14 through the through hole 90h of the gasket 90, the terminal lead-out hole 18 of the sealing plate 14, the through hole 70h of the positive electrode insulating member 70, and the through hole 51h of the first positive electrode current collecting unit 51 in order and is caused to protrude below the sealing plate 14. Then, a portion of the positive electrode terminal 30 protruding downward from the sealing plate 14 is crimped so that a compressive force is applied thereto in the vertical direction Z. Thus, the caulking portion 30c is formed at a tip portion (a lower end portion in FIG. 2) of the positive electrode terminal 30.

By such caulking, the gasket 90, the sealing plate 14, the positive electrode insulating member 70, and the first positive electrode current collecting unit 51 are integrally fixed to the sealing plate 14, and the terminal lead-out hole 18 is sealed. Also, the caulking portion 30c may be welded and joined to the first positive electrode current collecting unit 51. Thus, the reliability of conduction can be further improved.

The negative electrode terminal 40, the first negative electrode current collecting unit 61, and the negative electrode insulating member 80 can be fixed in the same manner as on the positive electrode side described above. That is, the negative electrode terminal 40 before caulking is inserted from above the sealing plate 14 through the through hole of the gasket, the terminal lead-out hole 19 of the sealing plate 14, the through hole of the negative electrode insulating member 80, and the through hole of the first negative electrode current collecting unit 61 in order and is caused to protrude below the sealing plate 14. Then, a portion of the negative electrode terminal 40 that protrudes downward from the sealing plate 14 is crimped so that a compressive force is applied thereto in the vertical direction Z. Thus, the caulking portion 40c is formed at a tip portion (a lower end portion in FIG. 2) of the negative electrode terminal 40.

Next, the positive electrode external conductive member 32 and the negative electrode external conductive member 42 are attached to the outer surface of the sealing plate 14 via the external insulating members 92. Also, materials of the external insulating members 92 may be the same as that of the positive electrode insulating member 70. Further, a timing of attaching the positive electrode external conductive member 32 and the negative electrode external conductive member 42 may be after the insertion step (for example, after the liquid injection hole 15 is sealed).

In the second attachment step, a second combined product as shown in FIG. 5 is produced using the first combined product produced in the first attachment step. Specifically, first, as shown in FIG. 6, three wound electrode bodies 20a to which the second positive electrode current collecting unit 52 and the second negative electrode current collecting unit 62 are attached are prepared and are disposed side by side in the short side direction X as the wound electrode bodies 20a, 20b, and 20c. In this case, the wound electrode bodies 20a, 20b, and 20c may all be arranged in parallel such that the second positive electrode current collecting unit 52 is disposed on one side in the long side direction Y (a left side in FIG. 5), and the second negative electrode current collecting unit 62 is disposed on the other side in the long side direction Y (a right side in FIG. 5).

Next, in a state in which the plurality of positive electrode tabs 22t are curved as shown in FIG. 4, the first positive electrode current collecting unit 51 (specifically, the second region 51b) fixed to the sealing plate 14 and the second positive electrode current collecting unit 52 (specifically, the current collecting plate connection portion 52a) of the wound electrode bodies 20a, 20b, and 20c are joined to each other. Further, in a state in which the plurality of negative electrode tabs 24t of the negative electrode tab group 25 are curved, the first negative electrode current collecting unit 61 fixed to the sealing plate 14 and the second negative electrode current collecting unit 62 of the wound electrode bodies 20a, 20b, and 20c are joined to each other. For the joining method, for example, welding such as ultrasonic welding, resistance welding, or laser welding can be used. In particular, it is preferable to use welding by radiating high energy rays such as a laser. By performing such welding, joint portions are formed in the recessed portion 52d of the second positive electrode current collecting unit 52 and the recessed portion 62d of the second negative electrode current collecting unit 62.

Figure 13:
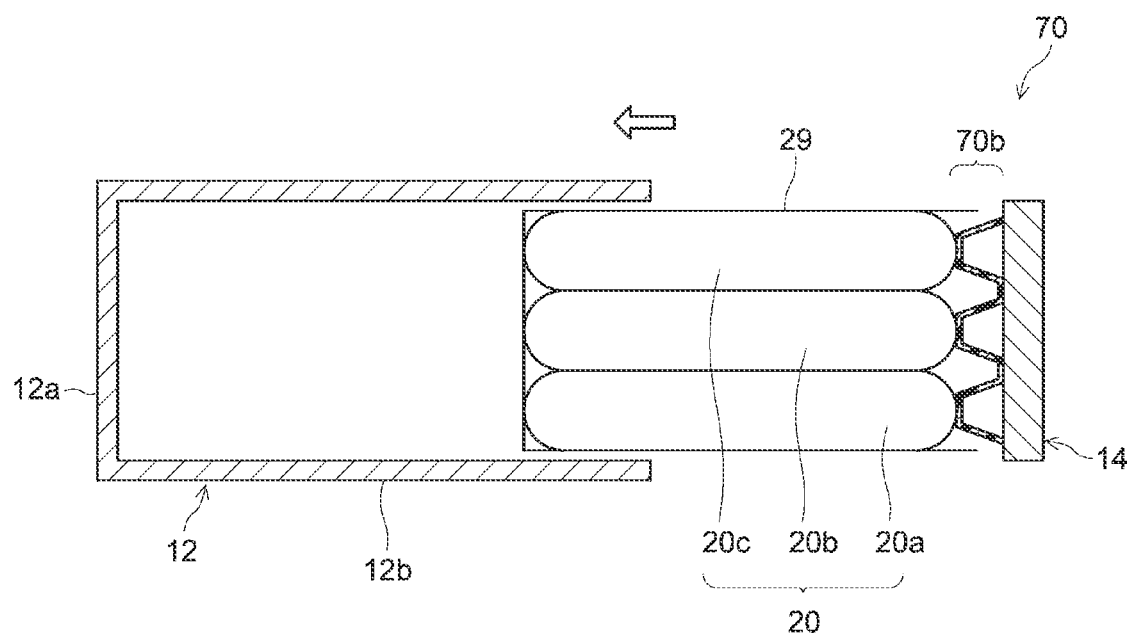
FIG. 13 is a schematic cross-sectional view illustrating a battery insertion step according to an embodiment.

In the insertion step, the electrode body group 20 integrated with the sealing plate 14 is accommodated in an internal space of the exterior body 12. FIG. 13 is a schematic cross-sectional view illustrating the insertion step. Specifically, first, for example, an insulating resin sheet made of a resin material such as polyethylene (PE) is bent into a bag shape or a box shape to prepare the electrode body holder 29. Next, the electrode body group 20 is accommodated in the electrode body holder 29. Then, the electrode body group 20 covered with the electrode body holder 29 is inserted into the exterior body 12. In a case in which a weight of the electrode body group 20 is heavy to be, approximately, 1 kg or more, for example, 1.5 kg or more, and further 2 to 3 kg, as shown in FIG. 13, the long side wall 12*b* of the exterior body 12 may be disposed to intersect the direction of gravity (with the exterior body 12 arranged sideways), and the electrode body group 20 may be inserted into the exterior body 12.

The curved portions 20*r* of the wound electrode bodies 20*a*, 20*b*, and 20*c* constituting the electrode body group 20 are pressed by the protruding portions 70*b* of the positive electrode insulating member 70 and/or the protruding portions 80*b* of the negative electrode insulating member 80 and are pushed into the exterior body 12. By pushing the electrode body group 20 thereinto with the protruding portion 70*b* and/or the protruding portions 80*b*, the load on the positive electrode tab group 23 and/or the negative electrode tab group 25 can be reduced.

The positive electrode tab group 23 and/or the negative electrode tab group 25 have a play that can be moved in a direction intersecting the protruding direction (typically, the vertical direction Z). For this reason, when the exterior body 12 is raised such that the sealing plate 14 comes upward after the electrode body group 20 is inserted into the exterior body 12, the electrode body group 20 moves slightly downward due to gravity. Thus, as shown in FIG. 3, the protruding portions 70*b* of the positive electrode insulating member 70 and the wound electrode bodies 20*a*, 20*b*, and 20*c* are disposed at positions separated from each other. Further, the protruding portions 80*b* of the negative electrode insulating member 80 and the wound electrode bodies 20*a*, 20*b*, and 20*c* are disposed at positions separated from each other.

In the sealing step, the sealing plate 14 is joined to an edge portion of the opening 12*h* of the exterior body 12 to seal the opening 12*h*. The sealing plate 14 can be joined by welding such as laser welding. After that, the electrolytic solution is injected from the liquid injection hole 15 and the liquid injection hole 15 is closed with the sealing member 16, thereby hermetically closing the battery 100.

In the activation step, first, the long side wall 12*b* of the sealed battery 100 is sandwiched by the restraining mechanism and pressed. Next, for the battery 100 in the pressed state, for example, initial charging, aging processing, and self-discharging inspection are sequentially performed in the same manner as in conventional cases. In the initial charging, an external power source is connected between the positive electrode terminal 30 and the negative electrode terminal 40 to charge the battery 100 to a predetermined voltage. In the aging processing, for example, the battery 100 is stored in a constant temperature bath set to a predetermined temperature condition (for example, 40 to 60° C.) and held for a predetermined time (for example, about 10 to 15 hours). In a self-discharging test, for example, first, the battery 100 after the aging processing is adjusted to a predetermined charging depth in a room temperature range (for example, 15 to 25° C.). Next, the battery 100 is left to stand for a certain period of time to self-discharge, and an amount of voltage drop is measured. Then, on the basis of the measured amount of voltage drop, whether an internal short circuit has occurred in the battery 100 is inspected (whether or not it is a good product).

In this way, the battery 100 can be manufactured.

The battery 100 can be used for various purposes, and, for example, it can be suitably used for power sources (driving power sources) for motors mounted on vehicles such as passenger cars or trucks. A type of vehicles is not particularly limited, and, for example, plug-in hybrid vehicles (PHVs), hybrid vehicles (HVs), and electric vehicles (EVs) can be exemplified. The battery 100 can be suitably used for constructing an assembled battery.

Although some embodiments of the present invention have been described above, the above embodiments are only examples. The present invention can be implemented in various other forms. The present invention can be carried out on the basis of the content disclosed in the present specification and common technical knowledge in the art. The technique described in the claims include various modifications and changes of the embodiments illustrated above. For example, it is possible to replace a part of the above-described embodiments with another modified example, and it is also possible to add another modified example to the above-described embodiments. Further, if a technical feature is not explained as essential, it can be deleted as appropriate.

For example, the battery 100 of the above-described embodiments includes the electrode body group 20 having the plurality of wound electrode bodies 20*a*, 20*b*, and 20*c*. The wound electrode bodies 20*b* and 20*c* had the same configuration as the wound electrode bodies 20*a*. However, they are not limited thereto. The wound electrode bodies 20*b* and 20*c* may have configurations different from that of the wound electrode body 20*a*. For example, the number of plurality of winding stop tapes 28 attached to the wound electrode bodies 20*a*, 20*b*, and 20*c* may be different from each other. Further, in the wound electrode bodies 20*a*, 20*b*, and 20*c*, the positions to which the plurality of winding stop tapes 28 are attached may be different from each other.

Figure 14:
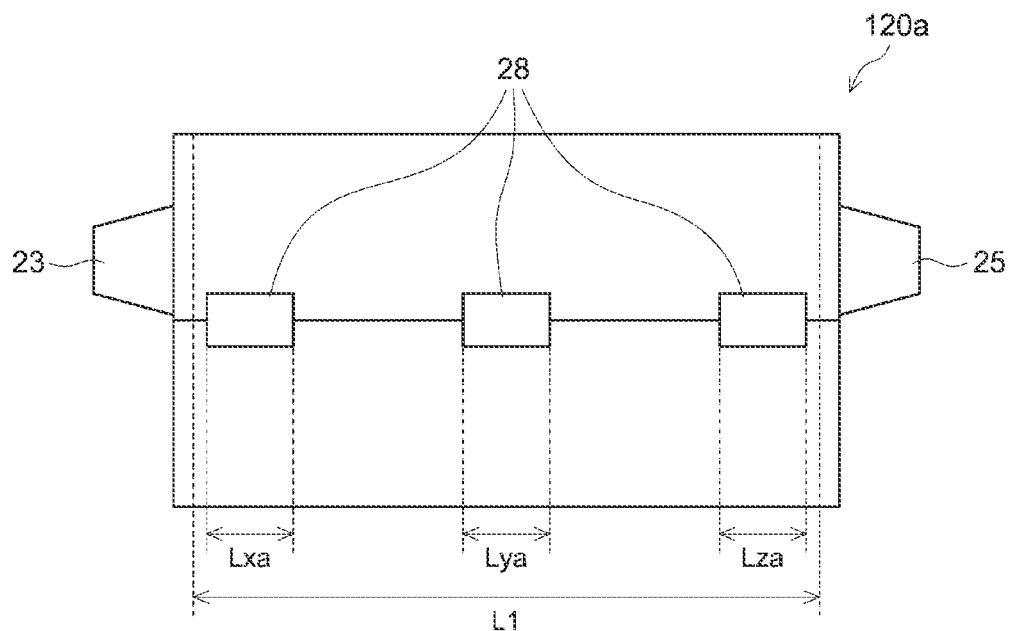
FIG. 14A is a diagram corresponding to FIG. 9B schematically showing a first wound electrode body of a battery according to a modified example.
FIG. 14B is a diagram corresponding to FIG. 9B schematically showing a second wound electrode body of the battery according to the modified example.
Figure 14B:
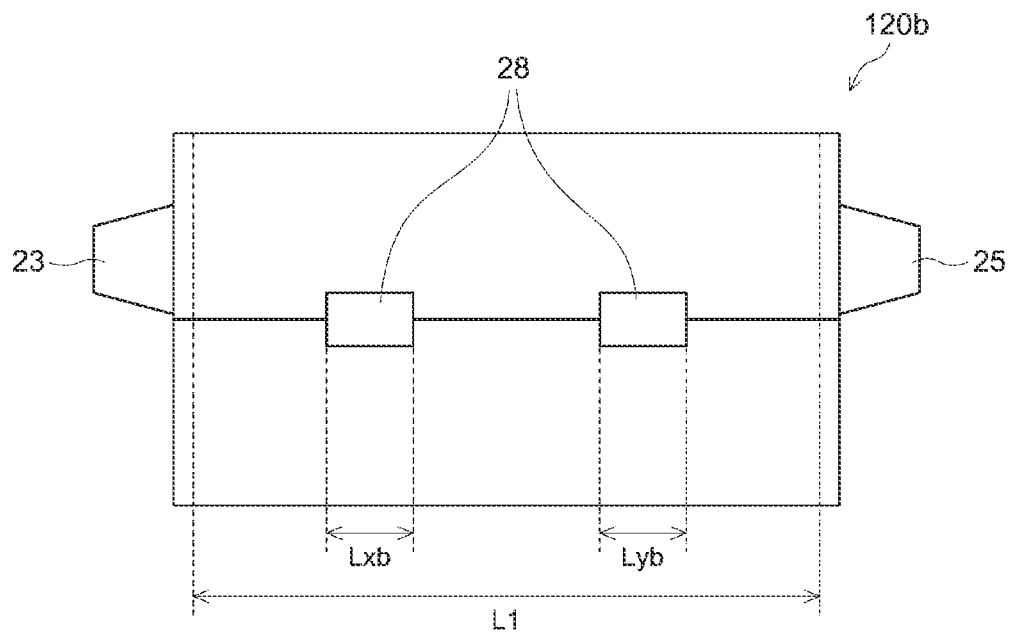

FIG. 14A is a front view schematically showing a first wound electrode body 120*a*. FIG. 14B is a front view schematically showing a second wound electrode body 120*b*. A battery according to a modified example has the first wound electrode body 120*a* and the second wound electrode body 120*b*. An odd number of winding stop tapes 28 are attached to an outer surface of the first wound electrode body 120*a*. An even number of winding stop tapes 28 are attached to an outer surface of the second wound electrode body 120*b*. The number of winding stop tapes 28 is different between the first wound electrode body 120*a* and the second wound electrode body 120*b*.

Further, in the first wound electrode body 120*a* and the second wound electrode body 120*b*, the winding stop tapes 28 are disposed to be displaced in the long side direction Y. Thus, it is possible to inhibit a local increase in the thickness of the electrode body group (the first wound electrode body 120*a* and the second wound electrode body 120*b*). In addition, the wound electrode bodies 120*a* and 120*b* can be charged and discharged in a well-balanced manner. In the long side direction Y, the total length (Lxa+Lya+Lza+Lxb+Lyb) of all lengths of the plurality of winding stop tapes 28 of the first wound electrode body 120*a* of FIG. 14A and all lengths of the plurality of winding stop tapes 28 of the second wound electrode body 120*b* of FIG. 14B may be substantially the same as the length L1 of the positive electrode active material layer of the first wound electrode body 120*a* and the second wound electrode body 120*b* (manufacturing errors may be allowed).

What is claimed is:

1. A battery, comprising:
    an exterior body including a bottom wall and an opening facing the bottom wall;
    a sealing plate sealing the opening of the exterior body;
    one or a plurality of wound electrode bodies in which a band-shaped positive electrode including a positive electrode active material layer and a band-shaped negative electrode including a negative electrode active material layer are laminated via a band-shaped separator and are wound around a winding axis;

a positive electrode tab group that includes a plurality of positive electrode tabs and is electrically connected to the positive electrode; and a negative electrode tab group that includes a plurality of negative electrode tabs and is electrically connected to the negative electrode, wherein the wound electrode body is accommodated in the exterior body such that the winding axis is along the bottom wall of the exterior body, a length of the positive electrode active material layer is 15 cm or more in a winding axis direction of the wound electrode body, the battery further comprises a plurality of winding stop tapes each having a rectangular shape with long sides and short sides, the plurality of winding stop tapes are attached to an outer surface of the wound electrode body at intervals in the winding axis direction with the long sides oriented along the winding axis direction, the wound electrode body includes a curved portion and a flat portion connected to the curved portion, each of the plurality of winding stop tapes is placed on the flat portion, the plurality of winding stop tapes includes first and second outermost winding stop tapes arranged at two opposite ends of the flat portion in the winding axis direction, and a third winding stop tape between the first and second outermost winding stop tapes in the winding axis direction, a width of each of the first and second outermost winding stop tapes in a direction perpendicular to the winding axis direction is smaller than a width of the flat portion in the direction perpendicular to the winding axis direction, a width of the third winding stop tape in the direction perpendicular to the winding axis direction is smaller than the width of the flat portion in the direction perpendicular to the winding axis direction, an entire area of all of the plurality of winding stop tapes is on the flat portion and is not on the curved portion, the curved portion is free of any winding stop tapes including an adhesive property, the plurality of positive electrode tabs protrudes at one end of the wound electrode body in the winding axis direction, the plurality of negative electrode tabs protrudes at another end of the wound electrode body in the winding axis direction, and the plurality of positive electrode tabs and the plurality of negative electrode tabs are provided at the flat portion and are not provided at the curved portion.

2. The battery according to claim 1, wherein the wound electrode body is provided in plurality.

3. The battery according to claim 1, wherein the positive electrode tab group and the negative electrode tab group are eccentrically disposed on the sealing plate side in a direction perpendicular to the sealing plate.

4. The battery according to claim 1, wherein the plurality of winding stop tapes are disposed on a straight line connecting the positive electrode tab group to the negative electrode tab group.

5. The battery according to claim 3, wherein the plurality of winding stop tapes are disposed on a straight line connecting the positive electrode tab group to the negative electrode tab group.

6. The battery according to claim 1, wherein, when the length of the positive electrode active material layer is 100% in the winding axis direction, a proportion of a total length of the plurality of winding stop tapes is 20% or more and 70% or less.

7. The battery according to claim 1, wherein a distance between the plurality of adjacent winding stop tapes is 30 mm or more and 105 mm or less.

8. The battery according to claim 1, wherein the plurality of winding stop tapes are disposed within the length of the positive electrode active material layer in the winding axis direction.

9. The battery according to claim 1, wherein the plurality of positive electrode tabs are provided at first intervals along a longitudinal direction of the positive electrode and overlap each other in the wound electrode body, and the plurality of negative electrode tabs are provided at second intervals along a longitudinal direction of the negative electrode and overlap each other in the wound electrode body.

10. The battery according to claim 9, wherein the plurality of positive electrode tabs are bent and electrically connected to the positive electrode terminal, and the plurality of negative electrode tabs are bent and electrically connected to the negative electrode terminal.

11. The battery according to claim 9, wherein the plurality of positive electrode tabs include:

a first positive electrode tab disposed at one end in a stacking direction of the plurality of positive electrode tabs and having a first width; and a second positive electrode tab disposed at another end in the stacking direction of the plurality of positive electrode tabs and having a second width less than the first width of the first positive electrode tab.

12. The battery according to claim 11, wherein the plurality of winding stop tapes are located closer to the first positive electrode tab than the second positive electrode tab in the stacking direction of the plurality of positive electrode tabs.

13. The battery according to claim 1, wherein each of the first and second outermost winding stop tapes is a single winding stop tape that is placed on the flap portion at a position closest to the corresponding end of the flat portion in the winding axis direction compared with other winding stop tapes of the plurality of the winding stop tapes.

14. The battery according to claim 1, wherein an interval between (i) the third winding stop tape and (ii) the first outermost winding stop tape or the second outermost winding stop tape in the winding axis direction is in a predetermined range of 30 mm to 105 mm.

15. A battery, comprising:

an exterior body;

one or a plurality of wound electrode bodies in which a band-shaped positive electrode including a positive electrode active material layer and a band-shaped negative electrode including a negative electrode active material layer are laminated via a band-shaped separator and are wound around a winding axis;

a positive electrode tab group that includes a plurality of positive electrode tabs and is electrically connected to the positive electrode; and a negative electrode tab group that includes a plurality of negative electrode tabs and is electrically connected to the negative electrode, wherein the wound electrode body is accommodated in the exterior body, a length of the positive electrode active material layer is 15 cm or more in a winding axis direction of the wound electrode body, the battery further comprises a plurality of winding stop tapes each having a rectangular shape with long sides and short sides, the plurality of winding stop tapes are attached to an outer surface of the wound electrode body at intervals in the winding axis direction with the long sides oriented along the winding axis direction, the wound electrode body includes a curved portion and a flat portion connected to the curved portion, each of the plurality of winding stop tapes is placed on the flat portion, the plurality of winding stop tapes includes first and second outermost winding stop tapes arranged at two opposite ends of the flat portion in the winding axis direction, and a third winding stop tape between the first and second outermost winding stop tapes in the winding axis direction, a width of each of the first and second outermost winding stop tapes in a direction perpendicular to the winding axis direction is smaller than a width of the flat portion in the direction perpendicular to the winding axis direction, and a width of the third winding stop tape in the direction perpendicular to the winding axis direction is smaller than the width of the flat portion in the direction perpendicular to the winding axis direction, an entire area of all of the plurality of winding stop tapes is on the flat portion and is not on the curved portion, the curved portion is free of any winding stop tapes including an adhesive property, the plurality of positive electrode tabs protrudes at one end of the wound electrode body in the winding axis direction, the plurality of negative electrode tabs protrudes at another end of the wound electrode body in the winding axis direction, and the plurality of positive electrode tabs and the plurality of negative electrode tabs are provided at the flat portion and are not provided at the curved portion.

\* \* \* \* \*